US005787587A

United States Patent [19]
Wahl et al.

[11] Patent Number: 5,787,587
[45] Date of Patent: Aug. 4, 1998

[54] VIBRATOR MOTOR

[75] Inventors: Gregory S. Wahl; Reuben Bilbrey; Rick Habben, all of Sterling, Ill.

[73] Assignee: Wahl Clipper Corp., Sterling, Ill.

[21] Appl. No.: 635,064

[22] Filed: Apr. 19, 1996

[51] Int. Cl.$^6$ .................... B26B 19/02; H02K 33/00
[52] U.S. Cl. ................... 30/210; 30/208; 310/29
[58] Field of Search .................. 30/43.9, 43.92, 30/208, 209, 210, 215, 216; 310/38, 29, 46, 47, 48

[56] References Cited

U.S. PATENT DOCUMENTS

| | | | |
|---|---|---|---|
| 1,558,729 | 10/1925 | Wahl | 30/208 |
| 1,798,756 | 3/1931 | Redfield | |
| 1,833,191 | 11/1931 | Van Osdel | |
| 1,834,737 | 12/1931 | Redfield | |
| 1,891,486 | 12/1932 | Wahl | |
| 2,063,116 | 12/1936 | Nordhem | 310/38 |
| 2,351,623 | 6/1944 | Martin | |
| 2,396,397 | 3/1946 | Tolmie | 310/29 |
| 2,699,509 | 1/1955 | Lee et al. | 30/210 |
| 2,759,114 | 8/1956 | Rolli et al. | 30/210 |
| 2,877,364 | 3/1959 | Wahl et al. | |
| 2,986,662 | 5/1961 | Wahl | |
| 3,026,430 | 3/1962 | Wahl | |
| 3,201,626 | 8/1965 | Calabrese et al. | |
| 3,207,935 | 9/1965 | Mosovsky et al. | |
| 3,312,842 | 4/1967 | Heuchling et al. | |
| 3,357,101 | 12/1967 | Davis | |
| 3,493,793 | 2/1970 | Niemela | 310/29 |
| 3,643,117 | 2/1972 | Alger et al. | |
| 4,278,907 | 7/1981 | Landgraf et al. | |
| 4,428,367 | 1/1984 | Wahl | |
| 4,506,182 | 3/1985 | Rohdin | |
| 4,719,376 | 1/1988 | Dean et al. | |
| 4,733,118 | 3/1988 | Mihalko | |
| 4,742,322 | 5/1988 | Johnson et al. | |
| 4,979,303 | 12/1990 | Han | |
| 5,054,199 | 10/1991 | Ogawa et al. | |
| 5,140,203 | 8/1992 | Reder et al. | |
| 5,241,425 | 8/1993 | Sakamoto et al. | |
| 5,263,218 | 11/1993 | Giuliani et al. | |

FOREIGN PATENT DOCUMENTS 1496637  8/1967  France.
350035  12/1960  Switzerland.

OTHER PUBLICATIONS

Model 'BMC' hair clipper by Andis Co. made prior to Apr. 19, 1995 (photo enclosed).
Model 'G' hair clipper by Andis Co. made prior to Apr. 19, 1995 (photo enclosed).
Model 'AEE' hair clipper by Andis Co. made prior to Apr. 19, 1995 (photo enclosed).
Model 'S1 II' hair clipper by Andis Co. made prior to Apr. 19, 1995 (photo enclosed).
Model 'ACT' hair clipper by Wahl Clipper Corp. made prior to Apr. 19, 1995 (photo enclosed).
Famulus Type R 75 motor made prior to Apr. 19, 1995 (photo enclosed).

Primary Examiner—Hwei-Siu Payer
Attorney, Agent, or Firm—Greer, Burns & Crain, Ltd.

[57] ABSTRACT

A vibrator motor for electric hair clippers, massagers and the like includes a fixed magnetically permeable piece and a moving magnetically permeable piece. The fixed and moving pieces form a plurality of flux gap zones between selected corresponding surfaces of the fixed and moving pieces.

Each of the flux gap zones has an air gap formed between the selected corresponding surfaces of the fixed piece and the moving piece. The air gaps have a total gap surface area, and an apparent gap surface area. The apparent gap surface area can be measured by viewing a selected surface which forms each gap through a plane which is generally perpendicular to the direction of the path of oscillating motion of the moving piece, or through a selected cross-section of the fixed or moving piece which is perpendicular to the path. In this invention, the total gap surface area of the gap in at least one of the flux gap zones is greater than the apparent gap surface area of that gap or gaps.

11 Claims, 6 Drawing Sheets

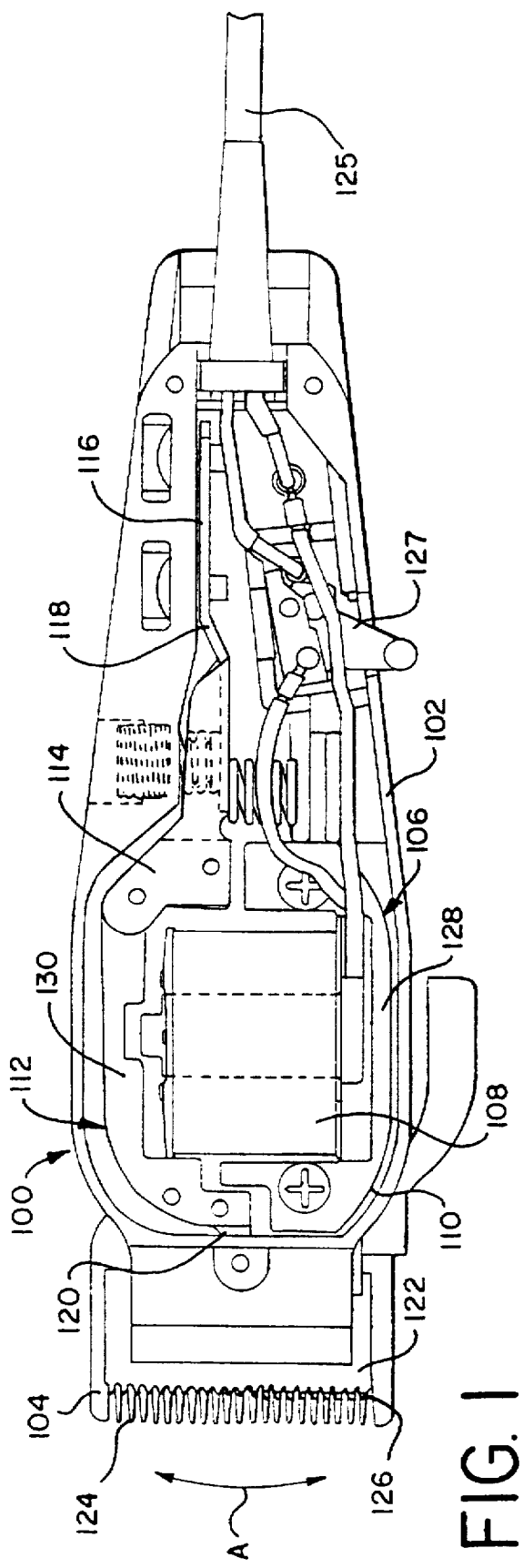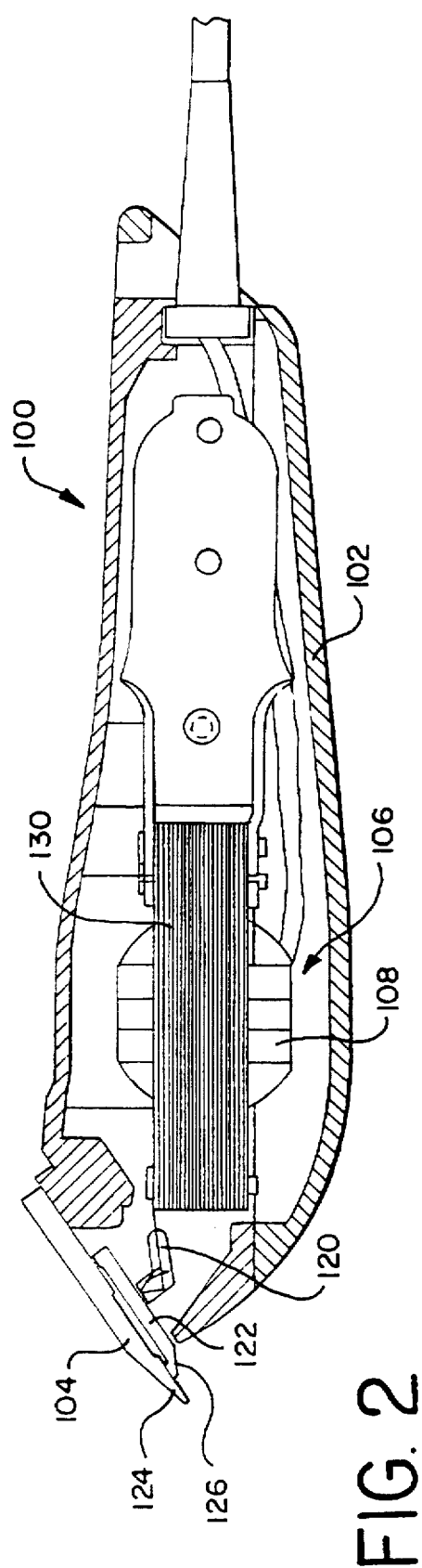

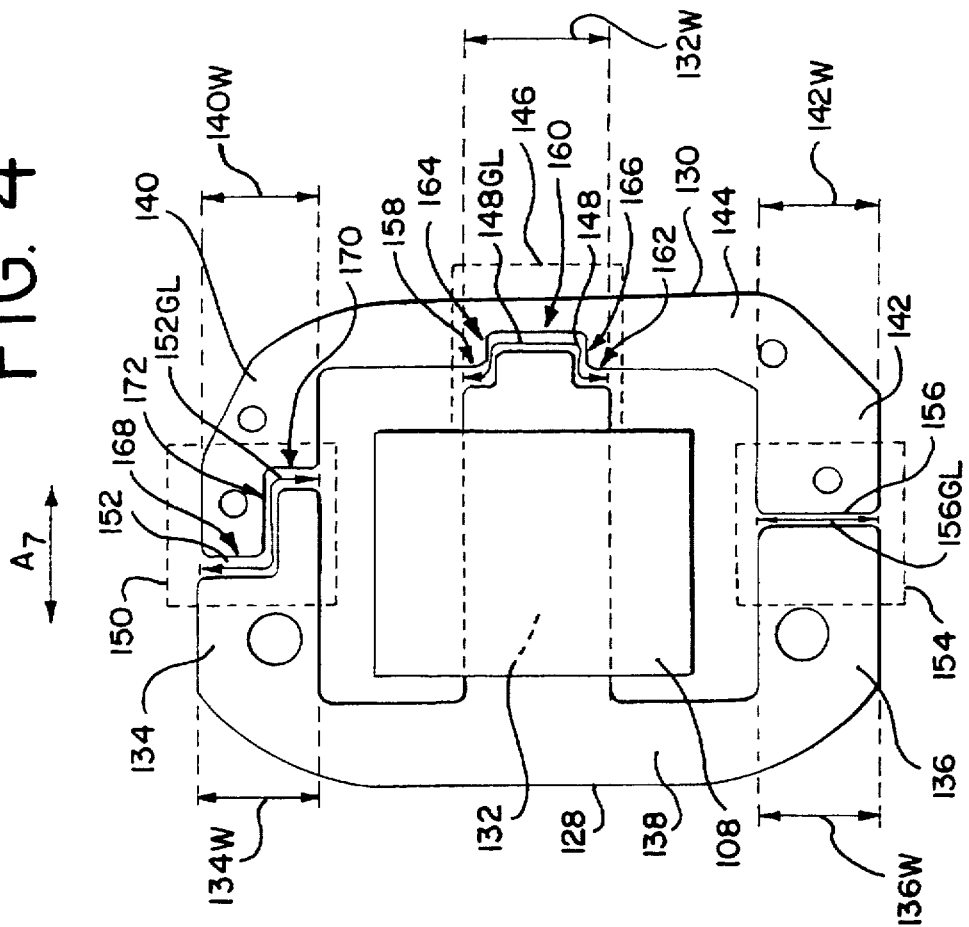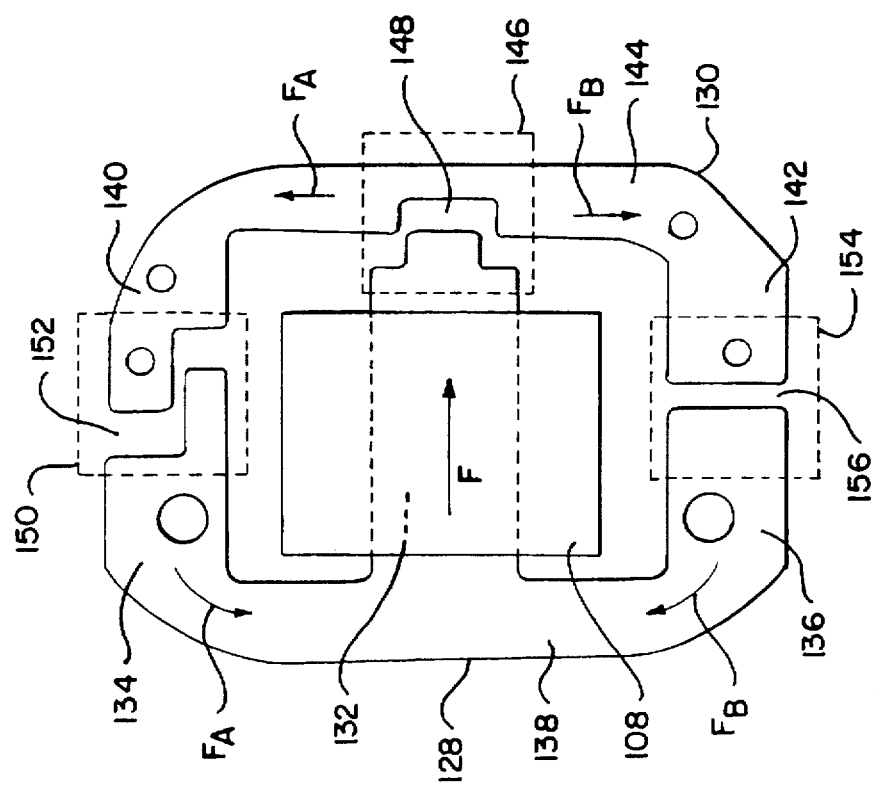

VIBRATOR MOTOR

This invention relates to vibrator motors, and more particularly to vibrator motors for hair clippers, massagers and the like which are more efficient, and produce higher power at lower temperature than conventional vibrator motors.

BACKGROUND OF THE INVENTION

Vibrator motors have been used in electric hair clippers for many years, as in U.S. Pat. Nos. 2,877,364, 2,986,662 and 3,026,430, incorporated by reference in their entirety. A conventional vibrator motor in a hair clipper is shown in FIG. 10, where a hair clipper 10 includes a case 12, a stationary hair cutting blade 14, and a reciprocating hair cutting blade 16. The blade 16 is moved by a vibrator motor 18, which includes a stationary coil 20, coil laminations 22 and moving laminations 24.

The coil laminations 22 are stationary within the case 12. The moving arm laminations 24 are part of a vibrating arm 26. The vibrating arm 26 also includes a tail bracket 28, which in turn includes a leaf spring 30. The arm 26 is operatively connected to the moving blade 16 through a resilient finger 32. A mechanical spring system 34 includes the tail bracket 28 fixed at one end 34 to the case 12, and coil springs 36 on each side of the tail bracket 28 and between adjacent walls of the case 12. The mechanical spring system 34 is designed so that the vibrating arm 26 has an appropriate resonant frequency.

The arm 26 vibrates in operation, causing the moving blade 16 to reciprocate along a path A in FIG. 10. Since the vibrating arm is fixed at the end 34, the arm laminations reciprocate in a slight arc.

The coil laminations 22 and moving laminations 24 are arranged to create three flux gap zones, indicated by dashed line rectangles 38, 40 and 42 in FIG. 10, in which magnetic flux generated by the coil 20 crosses over gaps 44, 46, 48, respectively, creating alternating magnetic poles which, in combination with the properly tuned mechanical spring system, cause the vibrating arm 26 to oscillate. In FIG. 10 and other figures, the flux gap zones may be illustrated larger than they actually are for clarity. The flux gap zones 38, 40, 42 are intended to cover the area where the magnetic fields have a relatively high flux density flowing between the moving and stationary poles of the laminations.

The air gaps 44, 46 and 48 (in flux gap zones 38, 40 and 42, respectively) are formed by generally parallel corresponding surfaces of the laminations which are substantially perpendicular to the directions of movement of the moving laminations 24. The position of the vibrating arm 26 is adjusted by rotating a threaded power screw 50 so that the gaps 44, 46 and 48 are a minimum during operation, thereby maximizing the magnetic efficiency of the conventional vibrator hair clipper motor. The spacing of the gaps 44, 46 and 48 changes constantly in operation, and the three-dimensional shape of the gaps changes accordingly. An apparent gap surface area of the fixed and moving laminations can be measured through a plane generally perpendicular to the direction of the path A of oscillating motion of the moving laminations. The measurement can be made in an appropriate cross-section of the laminations in the perpendicular plane, or it can be made by simply viewing a surface of one of the laminations which is representative of the area where significant flux flows through the perpendicular plane. In FIG. 10, the apparent gap surface area is about the same as the actual surface areas of the laminations where the gaps are formed. That is, the lengths of the gaps 44, 46 and 48 are about the same as the width of the narrowest lamination surface which forms the respective gaps. Thus, the gap length 46GL of the gap 46, for example, is about the same as the width 22W of the laminations 22 in the zone 40. The length of the gap 44 is about the same as the width 24W of the laminations 24 in the flux gap zone 38. The depths of the gaps are about the same as the thickness of the stack of laminations, as well.

Generally, the coil is energized with line voltage which alternates at 60 Hz or 50 Hz, and the vibrating arm oscillates at twice the line frequency. Increasing the ampere-turns passing through the coil increases hair cutting power, which is desirable, and also increases the distance the vibrating arm moves in operation, i.e., the stroke. However, the operating temperature also increases, which is undesirable. The same principles apply to massager vibrator motors.

While the conventional hair clippers just described have been useful and commercially successful, the motor windings reach a fairly high temperature during normal operation or when run continuously. Thus, there is a need for vibrating motors for hair clippers and other products which run more efficiently at lower outer surface and component temperatures, preferably with higher power, for faster hair-cutting or other purposes. There is also a need for hair clipper motors which are light and inexpensive to manufacture, yet perform consistently well over a desired range of manufacturing tolerances. Another need is for improvements in vibrator hair clipper motors, as well as vibrator motors for massagers and other products, which can be easily incorporated in existing product designs.

Thick hair, often found in animals, is more difficult to cut with a conventional vibrator hair clipper at a fast rate, due to the added power (i.e., oscillating force) needed, and increased tension required to press the two blades together and prevent them from separating under heavy cutting loads. As tension is increased on a conventional hair clipper, however, the stroke decreases, until the moving blade no longer cuts the hair. Thus, there is a need for vibrator hair clipper motors which can operate with higher tension, adequate stroke and higher oscillating force for cutting thick hair at a fast rate.

Sometimes hair clippers are used to cut close to the scalp, with the tips of the blade teeth placed directly against the scalp. Little or no blade overlap is desirable, but it is difficult to cut close to the scalp with conventional hair clippers because the tips of the teeth on the moving blades travel in a slight arc and can extend over the tips of the stationary teeth at the ends of the stroke, if the overlap is too small. Under some conditions, the moving teeth can touch the scalp, which is undesirable. A shorter stroke can be used by reducing the ampere-turns of the motor, but that can also reduce cutting power to an unacceptable level. Thus, there is a need for vibrator motors for hair clippers which have higher cutting power with a short stroke.

Accordingly, one object of this invention is to provide new and improved vibrator motors.

Another object is to provide new and improved vibrator motors for hair clippers, massagers and the like.

Yet another object is to provide new and improved vibrator motors which provide higher power at lower temperature.

Still another object is to provide new and improved vibrator hair clipper motors having improved efficiency and reduced cost, with lower operating temperatures and increased cutting power.

3

Another object is to provide new and improved vibrator hair clipper motors which are simple to make and assemble, use less copper, and can be easily adapted for use in conventional vibrator hair clippers.

An additional object is to provide new and improved vibrator hair clippers which can maintain adequate cutting stroke in thick hair where greater tension is needed.

Another object is to provide new and improved vibrator hair clippers for cutting close to the scalp, where minimal blade overlap is needed.

A further object is to provide new and improved vibrator hair clippers which can realize the other objects of this invention over a range of manufacturing tolerance variations.

SUMMARY OF THE INVENTION

In keeping with one aspect of this invention, a vibrator motor for electric hair clippers, massagers and the like includes a fixed magnetically permeable piece and a moving magnetically permeable piece. The fixed and moving pieces form a plurality of flux gap zones between selected corresponding surfaces of the fixed and moving pieces.

The fixed piece is secured to a stationary portion. A mechanical spring system is connected to the moving piece, with one end of the mechanical spring system also being secured to the stationary portion. A coil generates magnetic fields between the fixed and moving pieces, the fields passing through the flux gap zones and causing the moving piece to oscillate along a predetermined path.

Each of the flux gap zones has an air gap formed between the selected corresponding surfaces of the fixed piece and the moving piece. The gaps define a spacing between the corresponding fixed and moving piece surfaces which varies at least in part as the moving piece oscillates.

It is possible to measure the approximate actual total surface area between the fixed and moving laminations which generally extends over the gap in each associated flux gap zone. The actual surface is compared with the apparent gap forming surface area of the laminations, measured using the perpendicular plane which was previously described. In this invention, however, the actual gap surface area of the gap in at least one of the flux gap zones is greater than its associated apparent gap surface area.

When the motor is used in a hair clipper, a moving blade is attached to the end of the vibrating arm opposite the mechanical spring system, and a stationary blade is secured to the case opposite to the moving blade. When alternating current is applied to the coil, the vibrating arm oscillates, and teeth in the moving blade reciprocate across teeth in the stationary blade, causing hair which enters between the teeth to be cut.

BRIEF DESCRIPTION OF THE DRAWINGS

The above-mentioned and other features of this invention and the manner of obtaining them will become more apparent, and the invention itself will be best understood by reference to the following description of several embodiments of the invention taken in conjunction with the accompanying drawings in which:

FIG. 1 is an interior view of a hair clipper with the lid removed, and having a vibrator motor made in accordance with one embodiment of the present invention;

FIG. 2 is a right side cross-sectional interior view of the hair clipper of FIG. 1, with the lid in place;

FIG. 3 is a plan view of the vibrator motor in the embodiment of FIG. 1, shown with the lamination assembly in an open position;

FIG. 4 is a plan view of the vibrator motor in the embodiment of FIG. 1, shown with the lamination assembly in a closed position;

DETAILED DESCRIPTION OF THE EMBODIMENTS

Figure 5:
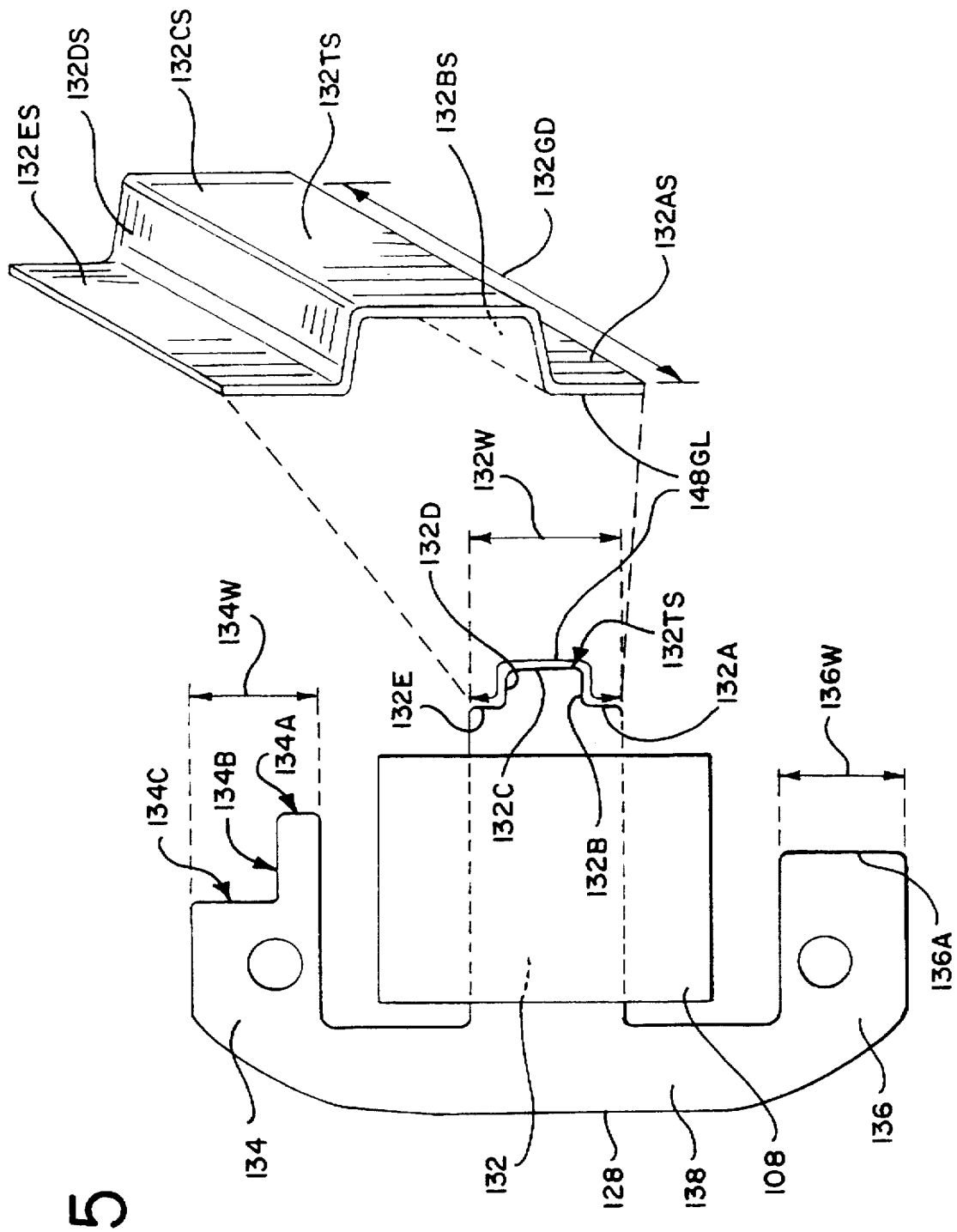
FIG. 5 is a top view of the stationary laminations in the motor of FIG. 1, showing part of the laminations in a partial perspective view.

As shown in FIGS. 1 and 2, a hair clipper 100 includes a housing 102 having a stationary clipper blade 104 mounted at one end. Secured within the housing 102 is an electromagnetic motor 106 which includes a coil 108 and an associated core 110.

An armature 112 having appreciable mass is mounted in an effective relation with the core 110, armature 112 including an armature arm 114 which is secured to the housing 102 at an end 116. The arm 114 includes a leaf spring portion 118 which is resilient or elastic, and allows the armature 112 to vibrate in use.

A drive finger 120 secured to the armature 112 engages a moveable clipper blade 122 which is mounted for cooperative action with the fixed clipper blade 104. The blades 104 and 122 have rows of teeth 124 and 126, respectively, which are arranged so that hair which enters between adjacent teeth 124 is cut as the teeth 126 move back and forth across the teeth 124.

The coil 108 is energized by AC current provided through a power cord 125 and switch 127. When the power is turned on, usually at 50 Hz or 60 Hz, the armature 112 vibrates along a path A in response to the varying magnetic field of the electro-magnet, and the blade 122 reciprocates. The core 110 includes a plurality of stacked laminations or other magnetically permeable material 128 which are secured to the housing 102 by screws or any other suitable structure. The armature 112 also includes stacked laminations or other magnetically permeable material 130.

As can be seen in FIGS. 3 and 4, the laminations 128 are generally E-shaped, with a center arm 132, two outer arms 134 and 136, and a back 138. The armature laminations 130 are generally C-shaped, and include two arms 140 and 142, and a back 144. The stationary laminations 128 and the moving laminations 130 form a magnetic circuit which is energized by the coil 108, as shown in FIG. 3. In operation, magnetic flux F passes through the center arm 132 into a first flux gap zone 146 which includes a gap 148. The flux enters the moving laminations 130 and is divided into two paths. Flux $F_A$ travels upwardly in FIG. 3 to a second flux gap zone 150 having a gap 152, which the flux $F_A$ crosses, and enters the stationary laminations 128. The flux $F_A$ then returns to the center arm 132. At the same time, flux $F_B$ travels downward in FIG. 3, to a third flux gap zone 154 having a gap 156. The flux $F_B$ crosses the gap 156 and enters the stationary laminations 128, returning to the center arm 132. The flux paths reverse and alternate with the alternating current flowing through the coil.

The flux gap zones 146, 150 and 154 are general representations indicating generally where there is substantial flux flow. The flux gap zones are shown larger than they actually are, however, for clarity. While the flux gap zones shown in the figures each have a single contiguous gap, it is contemplated that more than one gap could be used in a single flux zone, if desired.

The total length of the gap 148 is 148GL, measured along a line which runs along the center of the gap when the laminations are in a closed position. The total gap length 148GL includes gap portions 158, 164, 160, 166 and 162. The general area of highest flux concentration is across a width 132W of the arm 132, and the corresponding surface portion of the back 144. The total length of the gap 152 is 152GL, which includes gap portions 168, 170 and 172. The width of the arms 134W and 140W are about the same, and are shorter than the gap length 152GL. The total length of the gap 156 is 156GL. Arm widths 136W and 142W are about the same dimension, and are about the same as the gap length 156GL.

Figure 6:
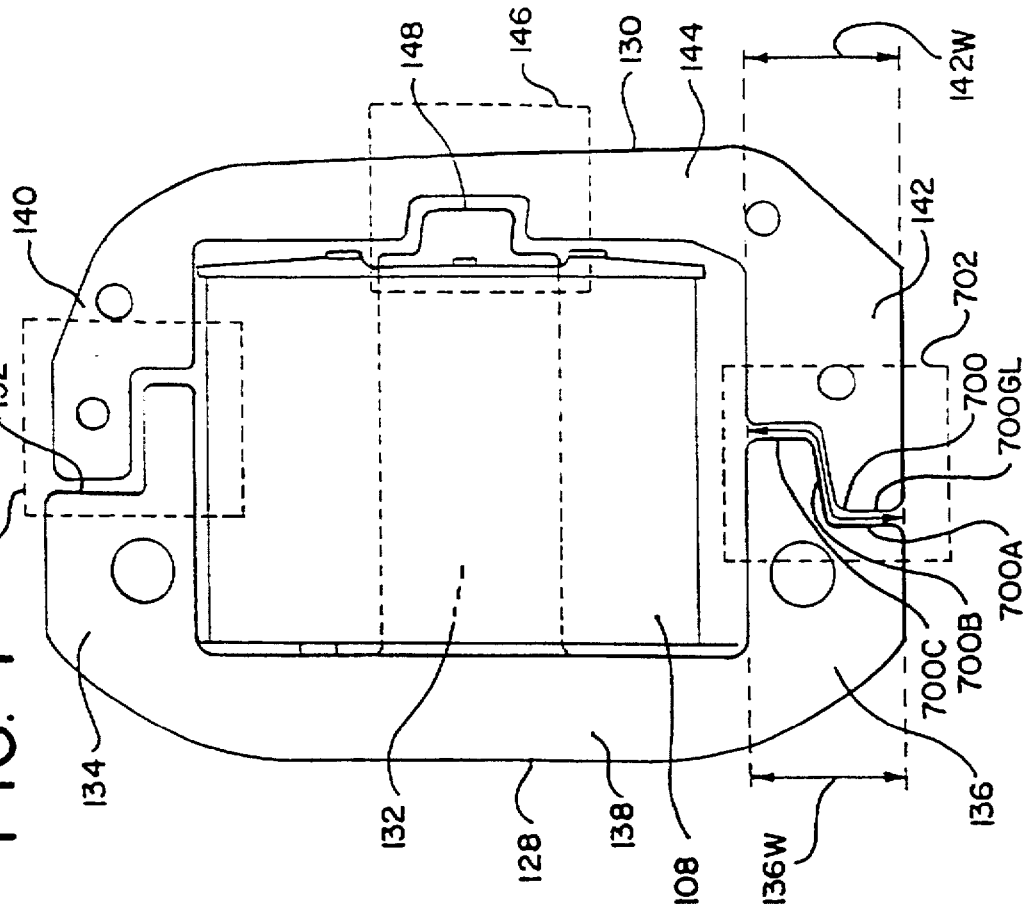
FIG. 6 is a side view of the stationary laminations shown in FIG. 5.

FIGS. 5 and 6 show top and side views of the core 110, respectively. The gap 148 in FIG. 4 is formed in part by a total surface area 132TS (FIG. 5) which is the total of the surface areas 132AS, 132BS, 132CS, 132DS and 132ES. Those surface areas can be measured with the total gap length 148GL as a point of reference. The surfaces 132BS, 132DS are at a slightly oblique angle to the surfaces 132AS, 132CS and 132ES, to accommodate the slight arc in the path of travel of the moving laminations.

The total gap surface area 132TS is approximately the product of the total gap length 148GL (i.e., the sum of the lengths 132A, 132B, 132C, 132D and 132E) times a gap surface depth 132GD. The surface 132TS can be measured at any suitable place, such as along the center of the space which defines the gap when the moving laminations are in their closed position in operation, closest to the fixed laminations, as at the line 148GL. The surface 132TS generally extends over the flux gap zone 146, where substantial flux passes. A portion of the corresponding surface of the back 144 of the laminations 130 could be used to evaluate the gap 148, but the entire surface would not be used for this purpose because substantial flux does not flow between the entire surface and the arm 132. Basically, the portion of the surface between the dotted lines which define 132W in FIG. 4 would be used for purposes of measuring the total actual surface area of the gap 148, because that is the region where there is high flux density across the gap.

FIG. 6 shows the surface 132TS when viewed through a plane which is perpendicular to the direction of the path of oscillating motion of the vibrating laminations. When the surface 132TS is viewed from that perspective, an apparent gap surface area 132AG can be seen. The apparent gap surface area 132AG is the product of the lamination width 132W which spans the gap 148, times the gap surface depth 132GD. The apparent gap surface could also be measured by taking a cross-section of the arm 132 in a plane perpendicular to the path A.

It can now be seen that the actual total surface area 132TS is greater than the apparent gap surface area 132AG. It can also be seen that the actual total gap surface area of the gap 152 is greater than its apparent gap surface area 134AG. In the configuration of the gap 156, which is used in conventional hair clippers, the actual total gap surface area is about the same as the apparent gap surface area 136 AG.

This invention can also be understood by considering the three total gap lengths 148GL, 152GL and 156GL, (FIGS. 3 and 4), as described. The gaps are formed by interfacing, but separate, surfaces of the laminations 128 and 130. While in some cases the widths of the laminations 128 and 130 at the interface are generally the same, as with the gaps 152 and 156, in other cases the width of one lamination surface is less than the width of the lamination surface on the other side, as with the gap 148.

The gap length 156GL is about the same as the dimension of the width 136W of the arm 136 and the width 142W of the arm 142, as in prior art devices. However, the dimension of the width 132W is less than the length 148GL of the gap 148, and the dimension of the width 134W of the arm 134 is shorter than the gap length 152GL. Generally, these width dimensions span their respective gaps in the plane generally perpendicular to the path of oscillating motion of the moving laminations 130. By making the length of at least one of the gaps longer than the width dimension of the narrower of the two laminations in the flux gap zones, the efficiency of the motor is improved, and hair clippers having such motors operate at a lower temperature while producing more power.

The gaps 148 and 152 include primary flux poles which are substantially perpendicular to the direction of motion across the air gap, and secondary flux poles which are generally parallel to the direction of primary flux flow, recognizing that the flux flow direction changes somewhat as it crosses the air gap. The secondary flux poles are generally perpendicular to the primary flux poles, and have a substantially constant small air gap but varying effective cross-sectional area as the arm oscillates in and out, as seen in FIGS. 3 and 4. Thus, the flux gap zone 146 includes primary flux poles at the surfaces 132A, 132C and 132E, and two secondary flux poles adjacent to the surfaces 132B and 132D. The flux gap 152 has a primary flux pole at a surface 134A, and a secondary flux pole at a surface 134B.

It can also be seen now that the gap 156 varies in spacing across the entire gap when the motor is in operation. The primary flux poles in the gaps 148 and 152 also vary in spacing as the vibrating laminations 130 oscillate, though the secondary flux poles of those gaps do not vary significantly in spacing when the motor operates.

As seen in FIGS. 3 and 4, the flux gap zones can have various configurations of primary and secondary poles. In addition, the improved motors can be made without secondary poles at each of the three flux gap zones. For manufacturing purposes, the optimum configuration can be empirically determined through experimentation with pole geometry, secondary gap lengths, and known design considerations such as coil windings and spring resonant frequency. For example, in the embodiment of FIGS. 1 through 6, the following approximate dimensions can be used: 132W: 0.492 inches, 134W, 136W, 140W and 142W: 0.400 inches; 132A, 132E: 0.125 inches; 132C: 0.25 inches; 132B, 132D: 0.125 inches; 134A: 0.15 inches; 134B: 0.3 inches; 134C: 0.26 inches. The spacing of the secondary pole gaps may be about 0.040 inch in mass production to accommodate manufacturing tolerances.

It is apparent that the moving laminations have a small angular component because the armature arm pivots along a radius about a fixed point. For this reason, the gap furthest from the pivot point opens further than gaps which are closer to the pivot point.

Adding secondary pole length decreases the stroke. Experiments have suggested that the effect of providing secondary poles is highest at the center arm, followed by the furthest arm from the pivot point, followed in turn by the closest arm to the pivot point.

Figure 7:
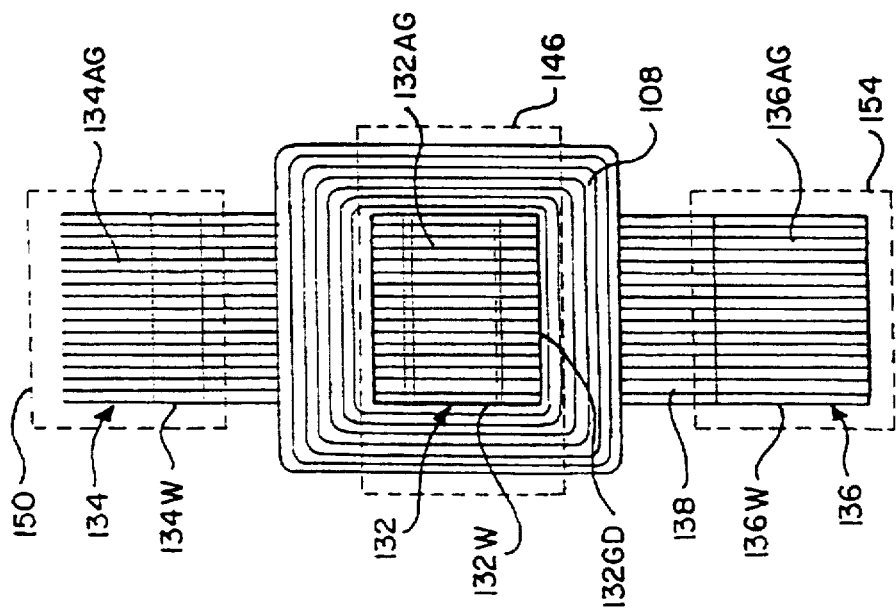
FIG. 7 is a plan view of an alternate embodiment of a motor lamination assembly made in accordance with the principles of this invention.

An alternate embodiment of fixed and moving laminations made according to the invention is shown in FIG. 7. The laminations in FIG. 7 are similar to those in FIG. 1, except that all three of the gaps have a total actual gap surface area which is greater than the apparent gap surface area. That is, all of the gaps have a longer total length than the width of the narrower of the interfacing laminations. FIG. 7 uses reference numerals from FIGS. 1 through 6 to identify like parts. However, in FIG. 7, a gap 700 in a flux gap zone 702 has a total linear length 700GL. The widths 136W, 142W of the arms 136, 142, which are about the same, are shorter than the gap length 700GL. The lengths 700A, 700B and 700C can be about 0.44 inches, 0.26 inches and 0.22 inches, respectively.

Figure 8:
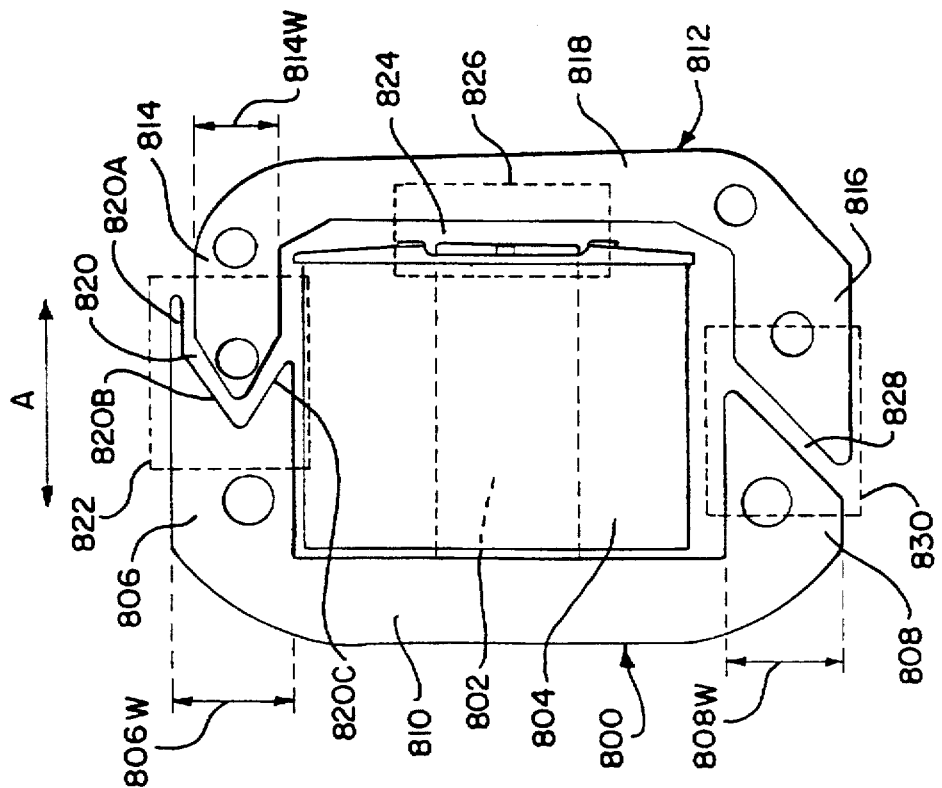
FIG. 8 is a plan view of another alternate embodiment of a motor lamination assembly made in accordance with the principles of this invention.
Figure 10:
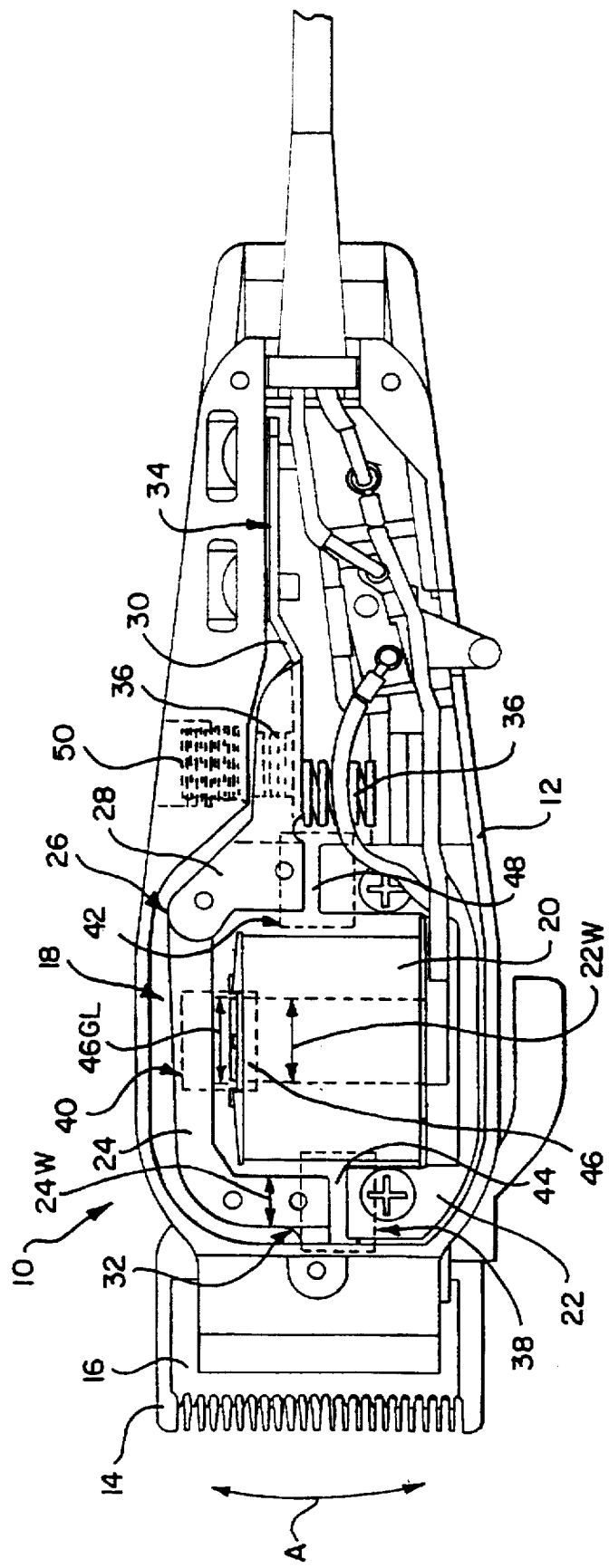
FIG. 10 is an interior view of a hair clipper made in accordance with the prior art.

Another alternate embodiment is shown in FIG. 8, where stationary laminations 800 include a center arm 802 having a coil 804, adjacent arms 806 and 808 on either side of the arm 802, and a generally perpendicular back portion 810. Moving laminations 812 are generally C-shaped and include arms 814 and 816, and a perpendicular back 818. This embodiment has a first gap 820 in a flux gap zone 822, a second gap 824 in a flux gap zone 826, and a third gap 828 in a flux gap zone 830.

The gap 820 is defined by a first surface 820A which is oriented generally parallel or in line with the direction of the moving laminations, to maintain a substantially constant air gap over that portion of the gap. A second surface 820B is at an oblique angle to the direction of movement, as is a third surface 820C. The total actual gap surface is greater than the apparent gap surface, and the total linear length of the gap 820 is longer than the width 814W of the arm 814. The width of the arm 814W is narrower than the width 806W of the arm 806.

The gap 824 is a conventional gap which has a total actual gap surface which is about the same as the apparent gap surface. The total linear length of the gap 824 is about equal to the width of the arm 802. The entire gap 824 is generally perpendicular to the path of the moving laminations.

The gap 828 has a single surface which is at an oblique angle to the path A of the moving laminations, making its actual gap surface area greater than its apparent gap surface area, and its total linear length longer than the width 808W of the arm 808.

Figure 9:
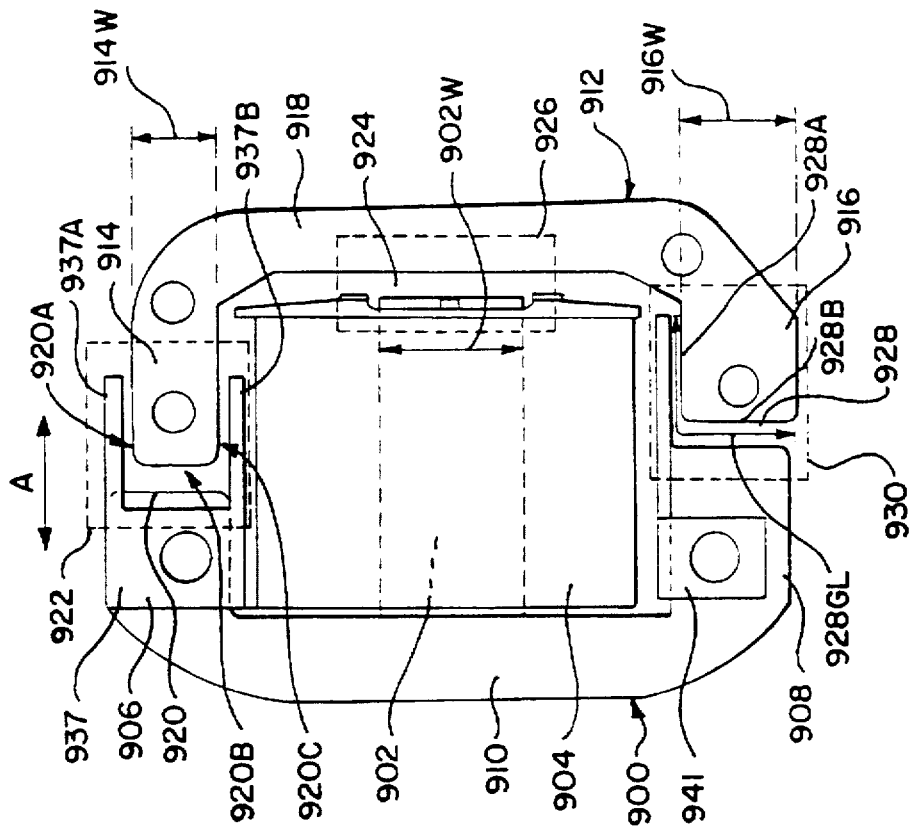
FIG. 9 is still another alternate embodiment of a motor lamination assembly made in accordance with the principles of this invention.

Still another embodiment of the invention is shown in FIG. 9. Stationary laminations 900 include a central arm 902 having a coil 904, two adjacent arms 906 and 908, and a generally perpendicular back 910. Moving laminations 912 include two arms 914 and 916, and a back section 918.

The laminations 900, 912 form a first gap 920 in a flux gap zone 922, a second gap 924 in a flux gap zone 926, and a third gap 928 in a flux gap zone 930.

The gap 920 includes a first portion 920A which is generally parallel to the direction of movement A of the moving laminations 912, a second portion 920B which is generally perpendicular to the direction of movement, and a third portion 920C which is also parallel to the direction of movement. The arm 906 can have a two-piece construction, as shown in FIG. 9, or a one-piece construction. In FIG. 9, a metal bracket 937 of magnetically permeable material is attached to the laminations 900 to form the gap 920 such that the actual total gap surface area is greater than the apparent gap surface area, and the total linear length of the gap 920 is greater than the width 914W. Arms 937A, 937B can be the same or different lengths.

In this particular embodiment, the gap 924 is a conventional gap which is oriented generally perpendicular to the direction of movement A of the laminations 912. The gap 924 has an actual total gap surface area about the same as its apparent gap surface area, and has a total linear length which is about equal to the width 902W of the arm 902.

The gap 928 is defined by a first gap surface 928A which is generally parallel to the direction of movement A, and a second gap surface 928B which is generally perpendicular to the direction of motion. The actual total gap surface area is greater than the apparent gap surface area, and the total linear length 928GL is greater than the width 916W. The gap 928 is formed in part by a magnetically permeable metal bracket 941 which is secured to the laminations 900 by a screw or any suitable device.

In operation, AC power is applied to the magnetic coil. Sixty or fifty Hertz line voltage is suitable, although square waves or any other suitable inductance inducing current would also work. In any event, current in the coil produces magnetic flux which flows through the stationary laminations and the vibrating laminations by passing across the gaps. The vibrating laminations reciprocate back and forth as the coil current changes direction, moving the moving blade teeth over the stationary teeth and cutting hair which is between the stationary teeth.

The motor generates more power than conventional vibrator motors, and operates at a lower temperature. Moreover, it can be used in otherwise conventional hair clippers, with little re-tooling. The motor is light and inexpensive to manufacture, yet performs well over generally accepted manufacturing tolerance ranges. The increased efficiency of the motor accommodates the use of less copper in the coil, because fewer ampere-turns are needed to operate the motor. If preferred, of course, higher power can be generated by increasing the ampere-turns in the coil, to cut thick hair at a fast rate.

Motors made in accordance with this invention have a shorter stroke than conventional vibrator motors. The combination of the short stroke with higher power facilitates cutting close to the scalp with the tips of the teeth because the arc of the moving blade is also reduced when the stroke is reduced, so the tips of the moving blade teeth can be moved closer to the tips of the stationary teeth. In the alternative, the shorter stroke can be increased by increasing the tensions in the mechanical spring system.

The advantages of this invention are now apparent. The increased actual gap surface created by the secondary flux poles increase efficiency, reducing power consumption and decreasing operating temperature while increasing power output. The spring system can be changed to increase stroke, while maintaining complete oscillations at twice the line frequency, which is desired. The motors are simpler to make and assemble, use less copper, and can be easily used in conventional vibrator hair clippers over a range of manufacturing tolerances. When used in hair clippers, the motor operates better in thick hair, and the clipper can be adjusted to cut closer to the scalp.

While the principles of the invention have been described above in connection with specific apparatus and applications, it is to be understood that this description is made only by way of example and not as a limitation on the scope of the invention.

I claim:

1. An electric hair clipper comprising
a stationary blade fixed to a housing,
a moving blade for reciprocating movement along a predetermined path adjacent said stationary blade, and a vibrator motor having a fixed magnetically permeable piece and a moving magnetically permeable piece forming a plurality of flux gap zones for substantial flux flow between said pieces, each of said flux gap zones having at least two air gaps between corresponding surfaces of said fixed and moving pieces;

said fixed piece being secured to said housing, said moving piece being secured to said moving blade;

a mechanical spring system connected to said moving piece, at least one end of said mechanical spring system being secured to said housing to form a pivot point; and means for generating varying magnetic fields between said fixed and moving pieces, said magnetic fields passing across said air gaps within said flux gap zones, said magnetic fields and said mechanical spring system causing said moving piece to oscillate along said predetermined path such that said gap furthest from said pivot point opens further than said gaps which are closer to said pivot point;

said flux gap zone furthest from said pivot point having at least a first primary flux pole in which a first selected surface of said fixed piece is generally perpendicular to said predetermined path, a second primary flux pole in which a second selected surface of said fixed piece is generally perpendicular to said predetermined path, and a first secondary flux pole between said first and second primary flux poles in which a third selected surface of said fixed piece is generally parallel to said predetermined path, one of said flux gap zones between said furthest gap zone and said pivot point having at least a first secondary flux pole in which a first selected surface of said fixed piece is generally parallel to said predetermined path, a second secondary flux pole in which a second selected surface of said fixed piece is generally parallel to said predetermined path, and a first primary flux pole between said first and second secondary flux poles in which a third selected surface of said fixed piece is generally perpendicular to said predetermined path, the total length of said first and second secondary flux poles of said one flux gap zone being about the same as the length of said primary flux pole.

2. The electric hair clipper of claim 1, wherein said one of said flux gap zones further includes second and third primary flux poles, said first secondary flux pole, said second secondary flux pole, and said first primary flux pole of said one flux gap zone being between said second and third primary flux poles of said one flux gap zone.

3. A vibrator motor comprising:

a fixed magnetically permeable piece and a moving magnetically permeable piece forming a plurality of flux gap zones for substantial flux flow between said pieces, each of said flux gap zones having at least two air gaps between corresponding surfaces of said fixed and moving pieces;

said fixed piece being secured to a stationary portion;

a mechanical spring system connected to said moving piece, at least one end of said mechanical spring system being secured to said stationary portion to form a pivot point; and means for generating varying magnetic fields between said fixed and moving pieces, said magnetic fields passing across said air gaps within said flux gap zones; said magnetic fields and said mechanical spring system causing said moving piece to oscillate along a predetermined path such that said gap furthest from said pivot point opens further than said gaps which are closer to said pivot point;

said flux gap zone furthest from said pivot point having at least a first primary flux pole in which a first selected surface of said fixed piece is generally perpendicular to said predetermined path, a second primary flux pole in which a second selected surface of said fixed piece is generally perpendicular to said predetermined path, and a first secondary flux pole between said first and second primary flux poles in which a third selected surface of said fixed piece is generally parallel to said predetermined path, one of said flux gap zones between said furthest gap zone and said pivot point having at least a first secondary flux pole in which a first selected surface of said fixed piece is generally parallel to said predetermined path, a second secondary flux pole in which a second selected surface of said fixed piece is generally parallel to said predetermined path, and a first primary flux pole between said first and second secondary flux poles in which a third selected surface of said fixed piece is generally perpendicular to said predetermined path, the total length of said first and second secondary flux poles of said one flux gap zone being about the same as the length of said primary flux pole of said one flux gap zone.

4. A vibrator motor of claim 3 wherein said one of said flux gap zones further includes second and third primary flux poles, said first secondary flux pole, said second secondary flux pole, and said first primary flux pole of said one flux gap zone being between said second and third primary flux poles of said one flux gap zone.

5. An electric hair clipper comprising a stationary blade fixed with respect to a housing, a moving blade for reciprocating movement along a predetermined path adjacent said stationary blade, and a vibrator motor having a fixed magnetically permeable piece and a moving magnetically permeable piece forming a plurality of flux gap zones for substantial flux flow between said pieces, each of said flux gap zones having at least one air gap between corresponding surfaces of said fixed and moving pieces;

said fixed piece being secured to said housing, said moving piece being secured to said moving blade;

a mechanical spring system connected to said moving piece, at least one end of said mechanical spring system being secured to said housing to form a pivot point; and means for generating varying magnetic fields between said fixed and moving pieces, said magnetic fields passing across said air gaps within said flux gap zones, said magnetic fields and said mechanical spring system causing said moving piece to oscillate along said predetermined path such that said gap furthest from said pivot point opens further than said gaps which are closer to said pivot point;

at least one of said flux gap zones having at least a first secondary flux pole in which a first selected surface of said fixed piece is generally parallel to said predetermined path, a second secondary flux pole in which a second selected surface of said fixed piece is generally parallel to said predetermined path, and a first primary flux pole between said first and second secondary flux poles in which a third selected surface of said fixed piece is generally perpendicular to said predetermined path, the total length of said first and second secondary flux poles being about the same as the length of said first primary flux pole.

6. The electric hair clipper of claim 5 wherein said at least one of said flux gap zones further includes second and third primary flux poles, said first secondary flux pole, said second secondary flux pole, and said first primary flux pole being between said second and third primary flux poles.

7. A vibrator motor comprising:

a fixed magnetically permeable piece and a moving magnetically permeable piece forming a plurality of flux gap zones for substantial flux flow between said pieces, each of said flux gap zones having at least one air gap between corresponding surfaces of said fixed and moving pieces;

said fixed piece being secured to a stationary portion;

a mechanical spring system connected to said moving piece, at least one end of said mechanical spring system being secured to said stationary portion to form a pivot point; and means for generating varying magnetic fields between said fixed and moving pieces, said magnetic fields passing across said air gaps within said flux gap zones, said magnetic fields and said mechanical spring system causing said moving piece to oscillate along a predetermined path such that said gap furthest from said pivot point opens further than said gaps which are closer to said pivot point;

at least one of said flux gap zones having at least a first secondary flux pole in which a first selected surface of said fixed piece is generally parallel to said predetermined path, a second secondary flux pole in which a second selected surface of said fixed piece is generally parallel to said predetermined path, and a first primary flux pole between said first and second secondary flux poles in which a third selected surface of said fixed piece is generally perpendicular to said predetermined path, the total length of said first and second secondary flux poles being about the same as the length of said first primary flux pole.

8. A vibrator motor of claim 7 wherein said at least one of said flux gap zones further includes second and third primary flux poles, said first secondary flux pole, said second secondary flux pole, and said first primary flux pole being between said second and third primary flux poles.

9. An electric hair clipper comprising a stationary blade fixed with respect to a housing, a moving blade secured to said housing for reciprocating movement along a predetermined path adjacent said stationary blade, and a vibrator motor having a fixed magnetically permeable piece and a moving magnetically permeable piece forming a plurality of flux gap zones for substantial flux flow between said pieces, each of said flux gap zones having at least one air gap between corresponding surfaces of said fixed and moving pieces;

said fixed piece being secured to said housing, said moving piece being secured to said moving blade;

a mechanical spring system connected to said moving piece, at least one end of said mechanical spring system being secured to said housing to form a pivot point; and means for generating varying magnetic fields between said fixed and moving pieces, said magnetic fields passing across said air gaps within said flux gap zones, said magnetic fields and said mechanical spring system causing said moving piece to oscillate along said predetermined path such that said gap furthest from said pivot point opens further than said gaps which are closer to said pivot point;

at least one of said flux gap zones having at least a first primary flux pole in which a first selected surface of said fixed piece is generally perpendicular to said predetermined path, a second primary flux pole in which a second selected surface of said fixed piece is generally perpendicular to said predetermined path, and a first secondary flux pole between said first and second primary flux poles in which a third selected surface of said fixed piece is generally parallel to said predetermined path.

10. A vibrator motor comprising:

a fixed magnetically permeable piece and a moving magnetically permeable piece forming a plurality of flux gap zones for substantial flux flow between said pieces, each of said flux gap zones having at least one air gap between corresponding surfaces of said fixed and moving pieces;

said fixed piece being secured to a stationary portion;

a mechanical spring system connected to said moving piece, at least one end of said mechanical spring system being secured to said stationary portion to form a pivot point; and means for generating varying magnetic fields between said fixed and moving pieces, said magnetic fields passing across said air gaps within said flux gap zones, said magnetic fields and said mechanical spring system causing said moving piece to oscillate along a predetermined path such that said gap furthest from said pivot point opens further than said gaps which are closer to said pivot point;

at least one of said flux gap zones having at least a first primary flux pole in which a first selected surface of said fixed piece is generally perpendicular to said predetermined path, a second primary flux pole in which a second selected surface of said fixed piece is generally perpendicular to said predetermined path, and a first secondary flux pole between said first and second primary flux poles in which a third selected surface of said fixed piece is generally parallel to said predetermined path.

11. The vibrator motor of claim 10 wherein said secondary flux pole is formed in part by a first bracket secured to said fixed piece.

* * * * *